United States Patent [19]

Hoogland

[11] Patent Number: 4,545,652

[45] Date of Patent: Oct. 8, 1985

[54] FLAT FIELD LENSES

[76] Inventor: Jan Hoogland, 41 Los Charros La., Portola Valley, Calif. 94025

[21] Appl. No.: 268,230

[22] Filed: May 29, 1981

[51] Int. Cl.⁴ ............................................. G02B 23/00
[52] U.S. Cl. ..................................... 350/432; 350/573
[58] Field of Search ............... 350/483, 572, 573, 432, 350/480

[56] References Cited

U.S. PATENT DOCUMENTS

| | | | |
|---|---|---|---|
| 2,346,062 | 4/1944 | Altman | 350/480 |
| 2,519,760 | 8/1950 | Hett | 88/57 |
| 2,571,308 | 10/1951 | Taylor | 350/480 |
| 2,899,862 | 8/1959 | Baker | 350/573 |
| 4,025,155 | 5/1977 | Imai | 350/573 |
| 4,168,882 | 9/1979 | Hopkins | 350/573 |
| 4,354,730 | 10/1982 | Bel | 350/483 |

*Primary Examiner*—John K. Corbin
*Assistant Examiner*—P. M. Dzierzynski
*Attorney, Agent, or Firm*—Townsend and Townsend

[57] ABSTRACT

A flat field lens system wherein the Petzval sum is corrected without requiring many spaced high powered elements or sharply bent elements. This is achieved by having the Petzval sum correction dominated by the index difference. In an embodiment suitable for use in endoscope transfer optics where medium or high aperture is required, the spherical aberration is best corrected by use of an aspheric surface on the low index material. Where high aperture is not required, as for example in a photographic wide angle objective, spherical aberration is kept low by using a relatively small aperture.

34 Claims, 15 Drawing Figures

B=.09  S=.28
N=-.08  P=.31
SONNAR 25 MM F/1.9  2 x 13°

FIG._ID. (PRIOR ART)

B=.24  S=.07
N=.07  P=.19
ZEISS 50 MM F/1.4  2x23°

FIG._IE. (PRIOR ART)

B=.05  S=.15
N=.29  P=.10
PENTAC 12 INCH F/5.6  2 x 15°

FLAT FIELD LENSES

FIELD OF THE INVENTION

The present invention relates generally to optical lens systems, and more particularly to lenses characterized by a flat field.

BACKGROUND OF THE INVENTION

The presence of a considerable amount of field curvature is a relatively basic feature of most refractive lens systems. However, there are certain applications where a flat field is necessary. Two examples of such applications are photographic objectives and to a somewhat lesser extent endoscope transfer optics. Unfortunately, field curvature is one of the hardest aberrations to correct, requiring increases in the complexity of the lens far in excess of those required to correct spherical and chromatic aberrations. While optical transfer systems typically do not require the same level of field curvature correction as photographic objectives, multiple transfer systems (field lenses as well as relay lenses) are much harder to correct. Thus, considerable effort has gone into designing lenses characterized by flat fields.

Petzval has shown that the field curvature is related to the so-called Petzval sum, P, which is given by:

$$P = \sum_i \phi_i/n_i$$

where $\phi_i$ is the power of the ith refractive surface; and $n_i$ is the refractive index at the ith surface. More particularly, in absence of astigmatism, the field curvature is equal to $-P$. Thus, the radius of curvature of the field of a single lens of unit power is equal to $-1/P = -n$ which represents a strongly curved field. In the case of multiple element lens systems, the Petzval sum strongly tends to be positive because the lens power is positive.

There are three basic methods of correcting the field curvature (reducing the Petzval sum), namely spacing, bending, and index difference. Each has been heralded as a milestone in the design of flat field lenses, and retains its importance today. The first method (spacing) is exemplified by the famous Cooke triplet form designed by H. Dennis Taylor and disclosed in U.S. Pat. No. 568,052. This method is based on the simple idea that an objective comprising a positive lens and a negative lens of equal and opposite powers and the same refractive index has a Petzval sum equal to 0, with the overall power of the system being determined by the separation of the elements. The actual triplet configuration is necessitated by the need to correct other aberrations.

The second basic method of correcting the field curvature (bending) is exemplified in the Hypergon designed by Goerz and disclosed in U.S. Pat. No. 706,650. This method utilizes bending of the elements. In this context, a purely unbent element has equal and opposite curvatures on both sides while the archetypical bent element has equal curvatures on both surfaces. It is noted that such a bent element having equal curvatures at its opposite surfaces represents spaced positive and negative surfaces of equal power and index, so that the Petzval sum vanishes with the overall power being provided by the separation of the two surfaces. Thus, bending represents a special case of separation within a single element. The use of bending to correct the field curvature is the basis of the double Gauss lens which continues to be a lens type of prime importance.

The third basic method of correcting the field curvature (index difference) is the so-called "new achromat" principle, utilizing differences of the refractive indices of the positive and negative elements. This principle, while recognized in the past, has presented problems that have hindered its usefulness. For example, the use of index difference in order to correct the Petzval sum requires the elements to have indices that differ in the opposite direction from what is required to correct spherical aberration. Thus, bent and spaced elements have had to be incorporated into any design attempting to use index difference.

It is possible to conceptualize the situation from a slightly different viewpoint. Rather than viewing the use of spacing, bending, and index difference as means for correcting the field curvature, one may equivalently recognize that the field curvature is largely independent of spacing, bending and index difference. Accordingly, one can select elements such that the Petzval sum vanishes, and then use bending, spacing and index difference to generate the overall power.

Most lens designs utilize a combination of the three methods. Although not previously recognized, a highly meaningful system of lens classification can be based on the relative importance of bending, spacing, and index difference as used to correct the Petzval sum (or generate power). Thus, as will be described below, it is possible to break up the Petzval sum correction into contributions by the various methods, and glean from the relative magnitudes of the individual contributions meaningful information relating to the inner workings of the lens.

It will be recognized that the use of spacing and bending to achieve a flat field lens presents certain problems. For example, when many elements have to be spaced, the system becomes very sensitive to tilt and decentration of the elements, and requires great precision in the lens mounting. In fact, spacing is effective only for relatively high powered components, which increases the criticality of the spacing. Sharply bent elements suffer from the problem that they are expensive to fabricate since only a small number of elements may be placed on the spherical grinding or polishing blocks used during fabrication. Accordingly, flat field lenses have tended to be expensive, both in their elements and in their mounts.

SUMMARY OF THE INVENTION

The present invention provides a flat field lens system wherein the Petzval sum is substantially corrected without requiring any spaced high powered elements or sharply bent elements. The system leads itself to mass production and is highly insensitive to tile and decentration of the components.

Broadly, the foregoing advantages are achieved in a lens system wherein the Petzval sum correction is dominated by the use of index difference. Physically, the lenses according to the present invention tend to be characterized by cemented positive groups having curved interfaces and gentle curvatures on the exposed surfaces. One way of characterizing the lenses mathematically is that the index difference contribution N dominates the total correction where N is as follows:

$$N = \frac{1}{n_{pos}} \sum_i \phi_i - \sum_i \frac{\phi_i}{n_i}$$

where $\phi_i$ is the power of the ith refracting surface, $n_i$ is the refractive index of the ith refracting surface, and $n_{pos}$ is a representative index for the positive element or elements. Other ways of expressing the dominance of the use of index difference will be discussed in the detailed description below.

In an embodiment suitable for use in endoscope relay optics where medium or high aperture is required, the spherical aberration is best corrected by use of an aspheric surface on the low index material. Certain plastics such as polycarbonate, polystyrene and its co-polymer with methyl methacrylate have an ideal combination of low refractive index and high dispersion. Where high aperture is not required, as for example in a photographic wide angle objective, spherical aberration may be kept low by using a relatively small aperture.

For a further understanding of the nature and advantages of the present invention, reference should be made to the remaining portions of the specification and the attached drawings.

BRIEF DESCRIPTION OF THE DRAWINGS

Cross hatching of the lens elements has been omitted in all the drawings to allow the ray paths to be more clearly seen.

PREFERRED SYSTEM OF CLASSIFICATION AND CHARACTERIZATION OF LENSES AS APPLIED TO PRIOR ART LENS DESIGNS

While lenses have typically been classified either by their date of development, by their complexity, or by their form, none of these classifications provides much insight into the rationale of the various lens designs.

In order to find a suitable basis for classifying lenses, it is useful to consider what one tries to accomplish in the design of a lens. Broadly, the object is to provide optical power and correct the associated aberrations. If one defines the complexity of the lens as the sum of the absolute values of the curvatures of the elements, it can be shown that the greatest increase of complexity arises from attempting to correct the curvature of field.

It has been recognized historically that positive power could be generated without increasing the field curvature by the expedients of spacing the lens elements, bending the lens elements, or utilizing differential indices of refraction. However, it has apparently not been previously recognized that an examination of the relative magnitudes of the different contributions to the correction of the Petzval sum provides a most useful method for classifying the lens as to its actual design rationale. Put another way, an examination of the way that the lens power has been generated while leaving the Petzval sum zero provides such information.

The discussion below will be phrased in terms of contributions to the Petzval sum correction, since that is what is most natural to optical designers. To examine the various contributions, the lens is first "unbent", then "collapsed," and then the index difference contribution and residual evaluated. These will now be described in more detail.

The first step in evaluating the contributions is to "unbend" all the elements and to recompute the overall power of the lens (it being assumed that the lens has originally unit power). To unbend each element, equal curvature is added to each of the surfaces until the two surfaces are rendered equal and opposite in curvature. The contribution to the Petzval sum correction from bending is then given by the negative of the change in power divided by a representative index of refraction $n_{pos}$. Preferably, $n_{pos}$ is the power averaged index over all surfaces of all the positive elements (de-cemented if necessary). For example, if the entire power of the lens were derived from bending, the change in power would be $-1$, and the contribution from bending would be $1/1.62 = 0.62$ (for Schott SK16 having an index of refraction of 1.62).

The second step in evaluating the contributions is to "collapse" the airspaces and the elements by bringing all the spherical refracting surfaces to a single location and recomputing the overall power of the lens. This is equivalent to evaluating the algebraic sum of all surface powers, regardless of location. The contribution to the Petzval sum correction from spacing is then given by the negative of the change in power divided by $n_{pos}$.

The next step is to directly evaluate the contribution due to index difference. This is given by $$N = \frac{1}{n_{pos}} \sum_i \phi_i - \sum_i \frac{\phi_i}{n_i}$$

The residual Petzval sum is then given by $$P = \sum_i \frac{\phi_i}{n_i}$$

At this point, having evaluated the various contributions, the inner workings of the lens may be understood. A few concrete examples are illustrated in FIGS. 1A-1F with the geometrical and optical parameters being tabulated in Appendices 1A-F.

Table 1 sets forth in tabular form the bending contribution B, the spacing contribution S, the index difference contribution N, the residual P, and $1/n_{pos}$ for the various lenses shown in FIGS. 1A-F. It should be noted that the values in Appendices 1A-F are based on the lenses as normalized for unit power, and the contributions are calculated accordingly.

TABLE 1

| Lens | B | S | N | P | $1/n_{pos}$ |
|---|---|---|---|---|---|
| Goerz Hypergon | 0.62 | 0.00 | 0.00 | 0.04 | 0.66 |
| Richter Topogon | 0.68 | 0.02 | −0.09 | 0.00 | 0.62 |
| Nikon retrofocus | 0.04 | 0.36 | 0.06 | 0.12 | 0.59 |
| Sonnar | 0.09 | 0.28 | −0.08 | 0.31 | 0.61 |
| Zeiss F/1.4 | 0.24 | 0.07 | 0.07 | 0.19 | 0.56 |

TABLE 1-continued

| Lens | B | S | N | P | $1/n_{pos}$ |
|---|---|---|---|---|---|
| Pentac | 0.05 | 0.15 | 0.29 | 0.10 | 0.59 |

Figure 1A:
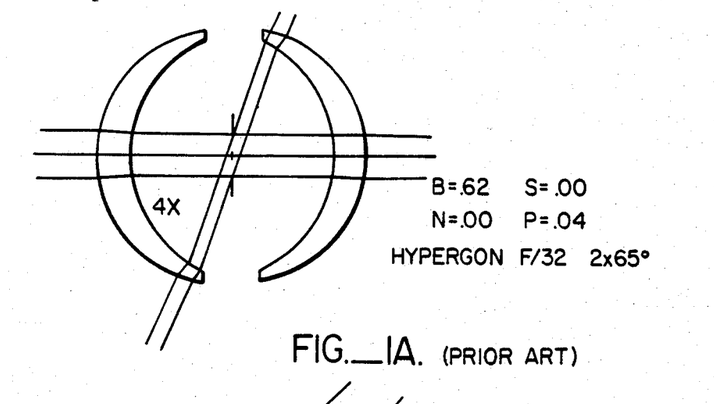
FIGS. 1A-1F are optical schematics of illustrative prior art flat field lens designs.
Figure 1B:
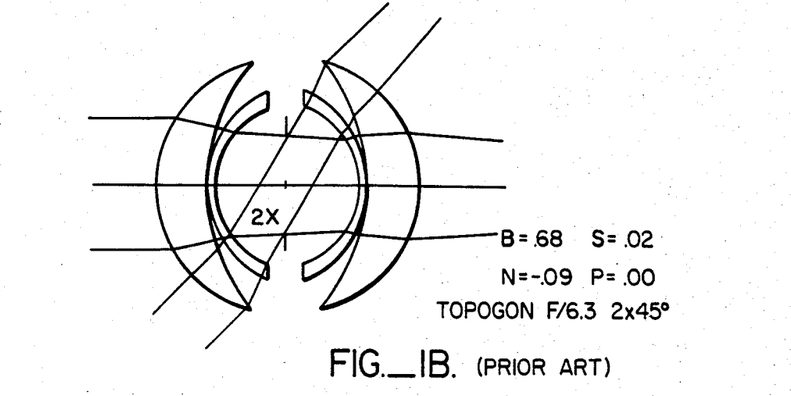
Figure 1C:
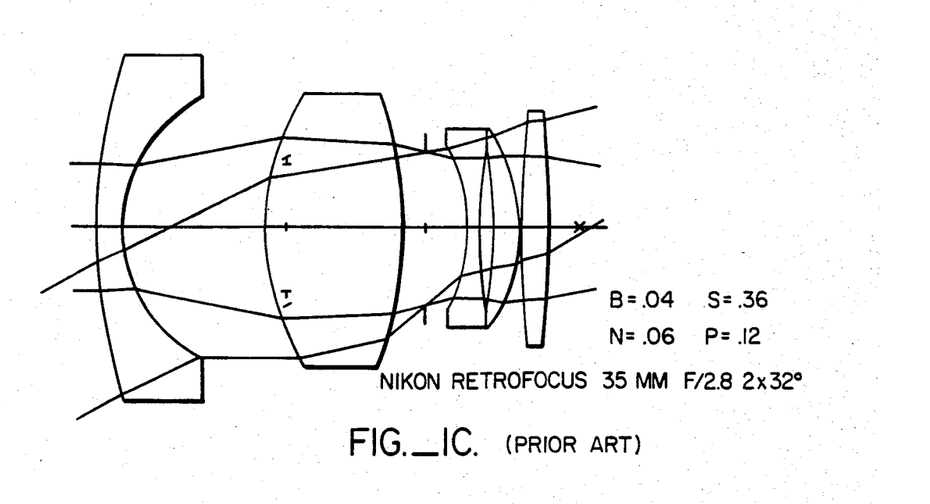
Figure 1D:
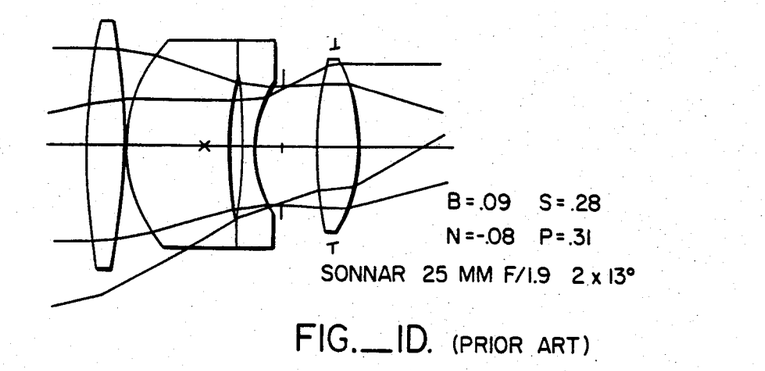
Figure 1E:
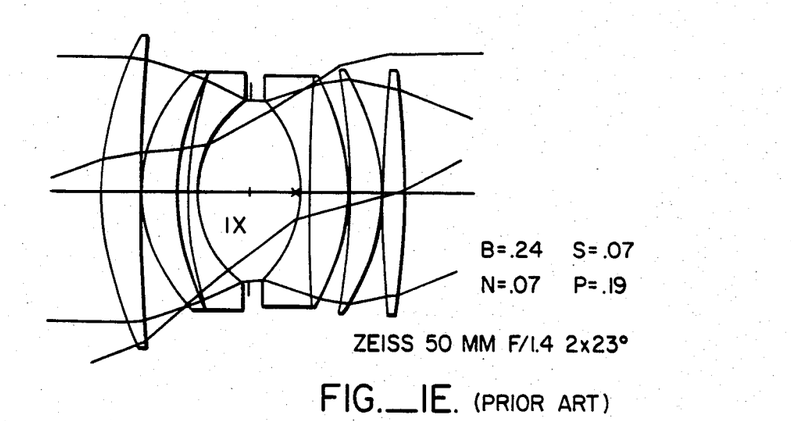
Figure 1F:
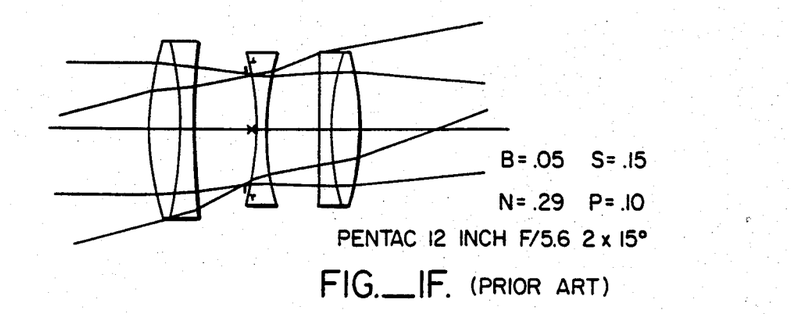

The Hypergon of FIG. 1A represents a nearly pure case of Petzval sum correction by bending. Similarly, the Topogon of FIG. 1B is dominated by bending. Some correction is also provided by spacing, which is offset by a negative correction due to index difference. The Nikon retrofocus design of FIG. 1C corrects the Petzval sum primarily by means of spacing. The Sonnar of FIG. 1D is characterized by a rather large residual P, but for the total correction, the dominant mechanism is spacing. The modern double Gauss objective of FIG. 1E utilizes all three mechanisms to correct the Petzval sum, while the Pentac of FIG. 1F essentially splits the correction between spacing and index difference.

DESCRIPTION OF THE PREFERRED EMBODIMENTS

The illustrative embodiments to be described below include four embodiments (one example of each) of an optical transfer system as used in an endoscope or the like, and one embodiment (two examples) of a wide angle objective. The description of the transfer systems will be in terms of "transfer modules" which are the portions between successive image planes or pupil planes, or for the symmetric embodiments below, in terms of half modules (portions between an image plane and a pupil plane). It will, however, be appreciated that it is the pair of adjacent quarter modules on either side of an image plane or a pupil plane (i.e. the central half of the whole module) that may be said to act as a field lens or a relay lens and for which the power is well defined.

Figure 2A:
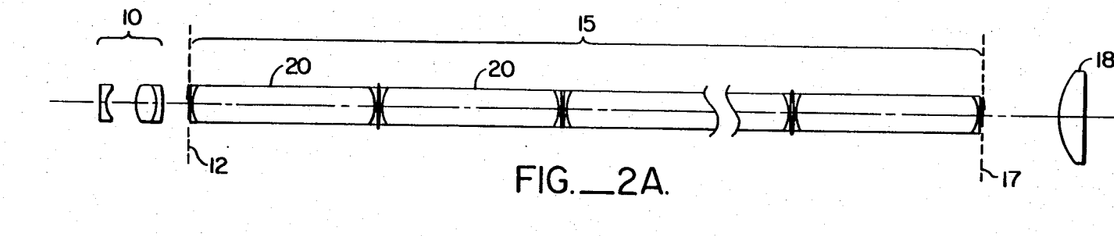
FIGS 2A-B are optical schematics of an endoscope and an endoscope transfer lens assembly according to a first embodiment of the present invention.

FIG. 2A is an optical schematic of a first embodiment of an endoscope optical system. The system comprises an objective 10 for forming an image in a first image plane 12, a transfer system 15 for transmitting the image in plane 12 to a second image plane 17, and an eyepiece 18 for viewing the transmitted image. Objective 10 and transfer system 15 occupy a relatively small diameter barrel which is typically surrounded by an annular fiber optics bundle. In use, the endoscope is inserted within a body cavity or the like for viewing of internal body regions by a physician. Objective 10 forms an image of the region to be viewed at first image plane 12, which image is transmitted by transfer system 15 to second image plane 17 proximate eyepiece 18 for viewing by the examining physician.

In a first embodiment, transfer system 15 comprises a plurality of cemented triplet assemblies 20 which represent an illustrative embodiment of the present invention. It will be appreciated that triplets 20 should be characterized by a field that is well corrected for field curvature in order that the image in plane 12 may be properly transmitted to the eyepiece. Triplets 20 are arranged in pairs, with each pair providing a transfer module.

Figure 2B:
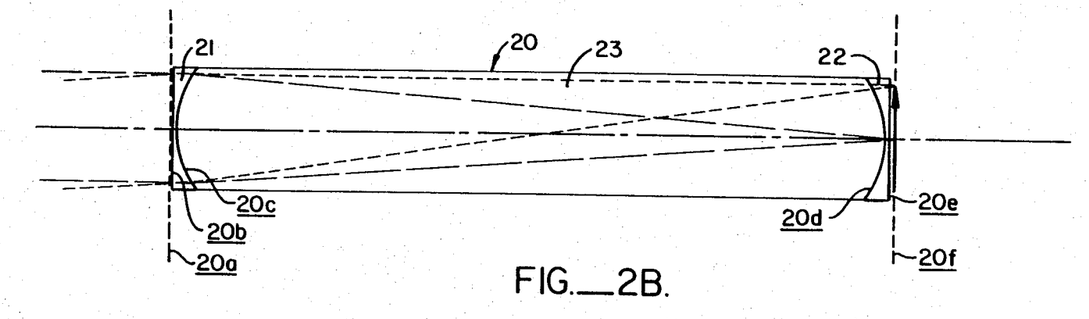

FIG. 2B is an optical schematic of one of triplets 20 illustrating the detailed construction thereof. In the preferred embodiment, triplets 20 are all identical, and as will be seen, are also symmetric from end to end. Triplet 20 includes first and second negative end elements 21 and 22 separated by a central elongate positive element 23. The geometrical characteristics of triplet 20 are defined by an entrance pupil plane 20a, a front surface 20b, a first cemented curved surface 20c, a second cemented curved surface 20d, a rear surface 20e, and an image plane 20f. An aperture stop is also provided at the surface 20f in order to define the field and avoid reflections off the endoscope optical barrel. The proper spacing of triplets 20 and the definition of the entrance pupil and field are conveniently provided by spacer rings (not shown) which may be cemented to the lenses prior to insertion within the barrel. The geometrical and optical parameters for a specific embodiment of triplet 20 are given in Appendix 2. The following system of nomenclature will be adopted. The radius of a given surface 20i will be designated $r_i$; the distance between a given pair of adjacent surfaces 20j and 20k will be designated $t_{jk}$; the index of refraction and Abbe number of the medium between surfaces 10j and 10k will be designated $n_{jk}$ and $v_{jk}$; and the diameter of a stop in plane 20i will be designated $d_i$. The dimensions are normalized so that a complete transfer module has a length of four units, which corresponds to unit focal length. Front and rear surfaces 20b and 20e also have an aspheric component characterized by the aspheric coefficients AD, AE, AF, and AG. These coefficients define a surface having base radius R and tangent to the X-Y plane at the origin having as its equation:

$$Z = R - \sqrt{R^2 - \rho^2} + AD\rho^4 + AE\rho^6 + AF\rho^8 + AG\rho^{10}$$

where $\rho^2 = x^2 + y^2$.

The general method of designing triplet assembly 20 may be outlined as follows. First, with the general configuration in mind, two reasonable indices of refraction are determined from a choice of suitable materials. For example, end elements 21 and 22 are formed of polystyrene which is characterized by high dispersion and low index of refraction, and is easy to injection mold. Central element 23 is formed of a crown glass having low dispersion and high index of refraction. Central element 23 provides strength for the cemented assembly.

Having determined the indices of refraction, and further imposing the requirement that the assembly by symmetric, the powers of the individual elements are determined by requiring the Petzval sum to vanish and further requiring a given overall power. At this point, the dispersions of material may be chosen to correct chromatic aberration. Spherical aberration, coma, and astigmatism are not yet corrected. However, the provision of an aspheric surface on outside elements 21 and 22 corrects spherical aberration, it being noted that with injection molding, it is no more difficult to provide an aspheric surface than a spherical surface. The stop location is now chosen to correct astigmatism, while coma and distortion are corrected by utilizing a symmetrical configuration with two identical axially aligned assemblies. It is noted that this embodiment has residual astigmatism which may compensate astigmatism in either the objective or the eyepiece.

The advantages of the design of assembly 20 may be seen. First, while each transfer module comprises size elements, there are only two different elements, namely the plastic end element and the central glass element. Furthermore, as described above, the plastic end elements may be injection molded. Steep surfaces as are characteristic of sharply bent elements are avoided, and assembly of the overall system is simple.

Figure 3A:
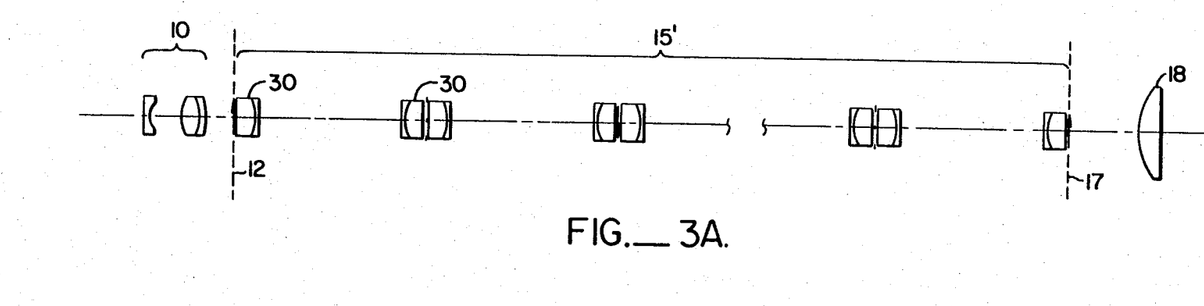
FIGS. 3A-B are optical schematics of an endoscope and an endoscope transfer lens assembly according to a second embodiment of the present invention.

FIG. 3A is an optical schematic of a second embodiment of an endoscope optical system which differs from the optical system of FIG. 2A in its transfer system 15'. Like reference numerals are used for the objective, the eyepiece, and first and second image planes. In this second embodiment, transfer system 15' comprises a plurality of cemented doublet assemblies 30, arranged in groups of four, each group of four providing a transfer module.

Figure 3B:
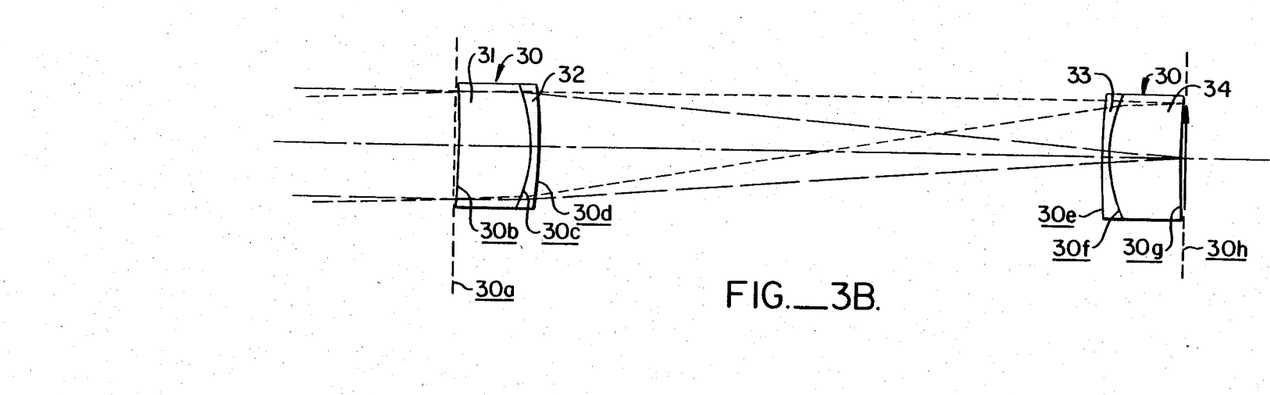

FIG. 3B is an optical schematic of a pair of the doublet assemblies that provide half a transfer module. The pair includes a first positive element 31, a first negative element 32 cemented thereto, a second negative element 33 spaced apart from negative element 32, and a second positive element 34 cemented to element 33. Negative elements 31 and 33, and positive elements 32 and 34 are preferably identical. The geometrical characteristics are defined by an entrance pupil plane 30a, a front surface 30b, a first cemented curved surface 30c, a first inside surface 30d, a second inside surface 30e, a second cemented curved surface 30f, a rear surface 30g, and an image plane 30h. The proper spacing of doublet assemblies 30 and the definition of the entrance pupil and field are conveniently provided by cylindrical spacers (not shown). The geometrical and optical parameters for a specific embodiment of doublets 30 are given in Appendix 3. As stated above, all of doublets 30 are preferably identical, although alternately reversed end for end. The same system of nomenclature as used for Appendix 2 is used. First and second inside surfaces 30d and 30e have an aspheric component characterized by the aspheric coefficients AD, AE, AF, and AG.

The design considerations for doublet assemblies 30 are generally similar to those disclosed for triplet assemblies 20. Transfer system 15' is characterized by a substantially complete elimination of astigmatism which may be desirable for certain applications. As with transfer system 15, transfer system 15' only requires two different elements.

Figure 4A:
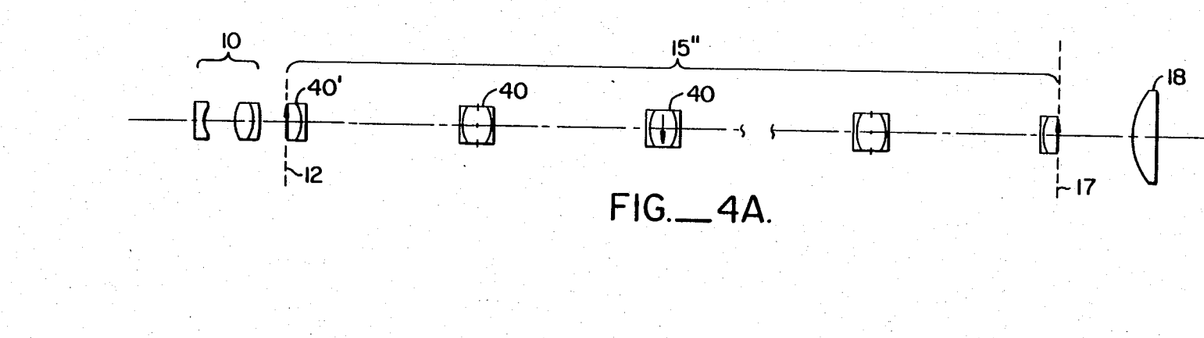
FIGS. 4A-B are optical schematics of an endoscope and an endoscope transfer lens assembly according to a third embodiment of the present invention.

FIG. 4A is an optical schematic of a third embodiment of an endoscope optical system having a different transfer system 15". Transfer system 15" is similar to transfer system 15' and can be conceptualized as the limiting case where the surfaces corresponding to 30b and 30h are flat, and the distance between surfaces 30g and 30h is zero, so that adjacent pairs of doublets 30 become triplets. Thus, transfer system 15" comprises a plurality of cemented triplet assemblies 40 with a half triplet (doublet) 40' at each end. A complete transfer module within transfer system 15" comprises a half triplet (or doublet), a triplet, and a second half triplet (or doublet).

Figure 4B:
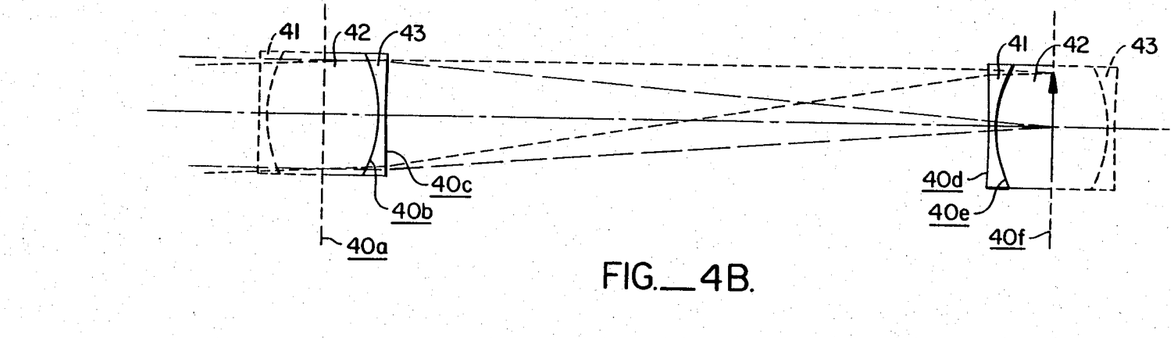

FIG. 4B is an optical schematic of the portions between successive medial planes of triplets 40. This corresponds to half a transfer module. It will be appreciated that either of the half triplets shown could be one of doublets 40'. Each triplet includes a first negative element 41, a central positive element 42, and a second negative element 43. For consistency of nomenclature, the surfaces will be named serially from one medial plane to the next. The system is characterized by a medial plane 40a within the first triplet, a cemented curved surface 40b within the first triplet, an exposed surface 40c on the first triplet, an exposed surface 40d on the second triplet, a cemented curved surface 40e in the second triplet, and a medial plane 40f within the second triplet. The proper spacing of lenses 40 and 40' is conveniently provided by cylindrical spacers (not shown). The aperture stop and field stop are provided in the medial planes. The geometrical and optical parameters for a specific embodiment are given in Appendix 4. The exposed surfaces of negative elements 41 and 43 (surfaces 40c and 40d) are characterized by a base radius and aspheric coefficients AD, AE, AF, and AG.

It is noted that while transfer system 15" has fewer components than transfer system 15', it requires three different elements, namely the plastic end element, the glass central element for the triplet, and the glass "half element" for the doublet. However, transfer system 15" could be implemented using triplets alone, so long as the eyepiece and objective are designed in recognition of the fact that there are, in effect, extra half triplets at the front and back ends of the system.

Figure 5A:
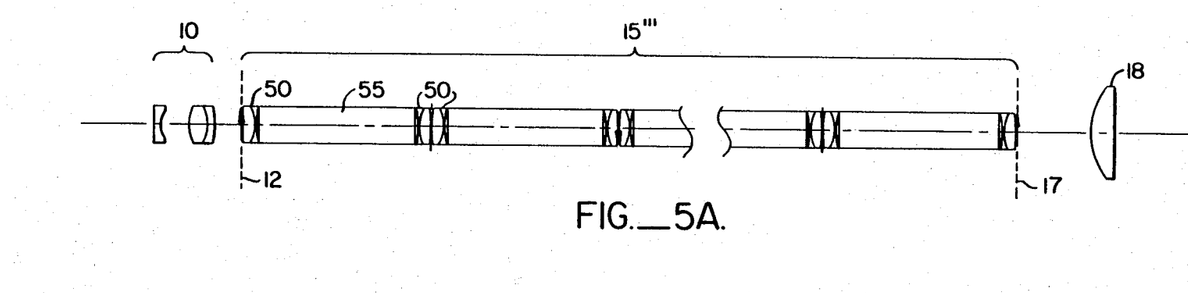
FIGS. 5A-B are optical schematics of an endoscope and an endoscope transfer lens assembly according to a fourth embodiment of the present invention.

FIG. 5A is an optical schematic of a fourth embodiment of an endoscope optical system having a different transfer system 15'''. Transfer system 15''' resembles transfer system 15' in that a transfer module comprises four cemented doublet assemblies 50, but differs in that the large airspace within each half module is replaced by a glass cylinder 55. The provision of the cylinder in this airspace permits greater information transfer. It is noted parenthetically that a similar design modification would be implemented in connection with suitably modified triplets corresponding to triplets 40 of transfer system 15' shown in FIGS. 4–B.

Figure 5B:
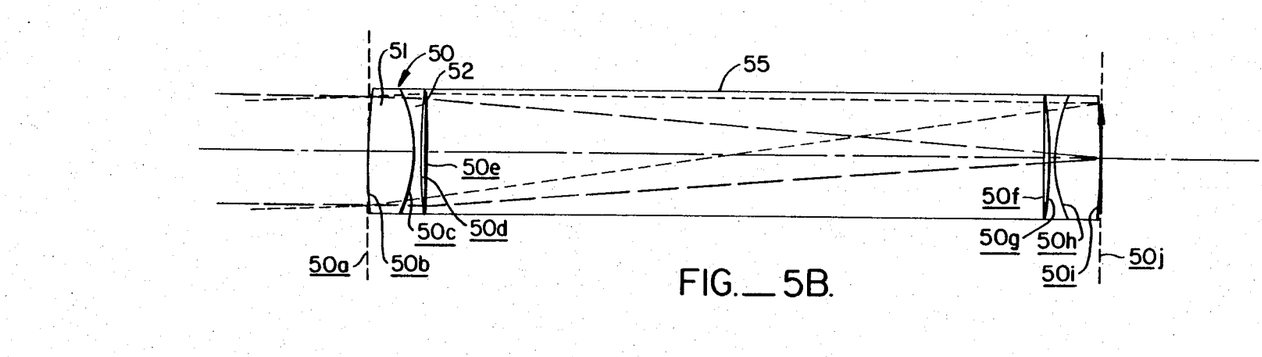

FIG. 5B is an optical schematic of half a transfer module comprising two symmetrically disposed doublets 50 with cylinder 55 in between. Each doublet 50 includes a positive element 51 and a negative element 52, and the half module is characterized by an entrance pupil plane 50a, a front surface 50b, a first cemented curved surface 50c, a first inside surface 50d, first and second cylinder surfaces 50e and 50f, a second inside surface 50g, a second cemented curved surface 50h, a rear surface 50i, and an image plane 50j. The geometrical and optical parameters for a specific embodiment of doublets 50 and cylinder 55 are given in Appendix 5. It is noted that first and second inside surfaces 50d and 50g are characterized by a base radius and aspheric coefficients AD, AE, AF, and AG.

Figure 6:
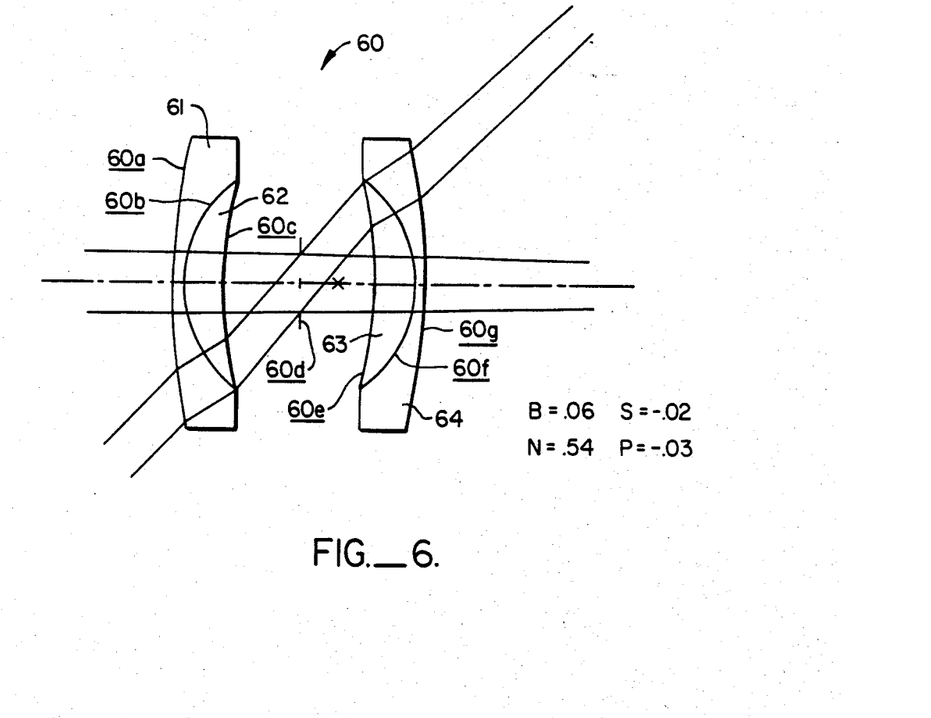
FIG. 6 is an optical schematic of a wide angle lens according to the present invention.

FIG. 6 is an optical schematic of a wide angle lens 60 constructed according to the present invention. Wide angle lens 60 includes four elements arranged in cemented pairs, including a negative front element 61, a positive element 62 cemented thereto, a spaced positive element 63 and a negative rear element 64 cemented thereto. Lens 60 is characterized by a front surface 60a, a first cemented curved surface 60b, a first inside surface 60c, an aperture stop plane 60d, a second inside surface 60e, a second cemented curved surface 60f, and a rear surface 60g. The geometrical and optical parameters for two embodiments of wide angle lens 60 are set forth in Appendices 6A and 6B with the same nomenclature as used for the endoscope transfer systems discussed above.

This is a very wide angle lens (corresponding to 18 mm focal length if scaled for 35 mm photography). While a little on the slow side, the lens is characterized by extremely low distortion, and thus is an excellent lens for architectural photography.

Table 2 sets forth in tabular form the Petzval sum correction contributions B, S, and N, the residual P, and $1/n_{pos}$ for the endoscope transfer lenses of FIGS. 2B, 3B, 4B, and 5B and for the two wide angle objectives of FIG. 6. All values are normalized for unit power. It is noted that for each of the transfer systems, the values and the power are for the central half of a transfer module.

TABLE 2

| Lens | B | S | N | P | $1/n_{pos}$ |
|---|---|---|---|---|---|
| transfer (App. 2) | .00 | .00 | .20 | .35 | .55 |
| transfer (App. 3) | .00 | −.04 | .17 | .43 | .56 |
| transfer (App. 4) | .00 | −.02 | .36 | .19 | .53 |
| transfer (App. 5) | .00 | −.02 | .29 | .26 | .53 |
| wide angle (App. 6A) | .06 | −.02 | .54 | −.03 | .56 |
| wide angle (App. 6B) | .08 | −.02 | .49 | −.01 | .53 |

The features of the present invention may be seen. Most striking is that the index difference contribution N dominates the total contribution B+S+N, ranging from about 90% to 130%. The pentac (FIG. 1F) is an extreme prior art situation, and the ratio is less than 60%. A ratio of about ⅔ to ¾ appears to be a fair statement of the lower limit for the present invention. It is also noted that the photographic objectives are very well corrected, in fact a little over-corrected. While at first glance the residual values P for the transfer systems appear somewhat high, several points must be kept in mind. First, the values are still generally less than other prior art transfer systems. Second, the object field for endoscopy is typically curved, and so some field curvature may be preferable to compensate for this. Third, the design easily admits to any desired reduction of the Petzval sum, but a greater reduction tends to require sharper internal curvatures. The examples represent a compromise that has relatively gentle curves and is thus easy to fabricate.

In summary, it can be seen that the present invention provides a flat field lens system which eliminates the need for multiple spaced elements and sharply bent elements and is thus highly insensitive to tilt and decentration of the components. The lenses of the present invention may be configured in many ways for use in many applications.

While the above represents a full and complete disclosure of the preferred embodiments of the present invention, various modifications, alternate constructions, and equivalents may be employed without departing from the true spirit and scope of the invention. For example, while the photographic objectives are very well corrected for field curvature (residual Petzval sum P is very small), the present invention may also be employed where the Petzval sum is not to be completely corrected, so long as the index difference contribution dominates the total correction. Thus, the present invention is drawn to the index difference being the dominant mechanism for achieving the correction of the Petzval sum to whatever level is desired. Moreover, while the contributions were shown as being calculated in a particular way, it will be appreciated that one could calculate the contributions in slightly different ways without materially affecting the relative magnitudes thereof. For example, the bending contribution could be calculated by adding curvatures to opposite surfaces of an element until one of the surfaces was flat (rather than until a symmetrical configuration was achieved). Therefore, the above description and illustrations should not be construed as limiting the scope of the invention which is defined in the appended claims.

Appendix 1A
(Prior Art)
Goerz Hypergon

Focal Length: EFL = 1.0000
Aperture ratio: 1:32
Back Focal Length: BFL = .8986
Field Angle: 2 × 65°

| Surface No. | Radius | Distance to Next Surface | Refractive Index | Abbe Number |
|---|---|---|---|---|
| 1 | 0.0846 | | | |
| | | 0.0220 | 1.5201 | 64.9 |
| 2 | 0.0850 | | | |
| | | 0.0679 | | |
| 3 | Aperture stop | | | |
| | | 0.0679 | | |
| 4 | −0.0850 | | | |
| | | 0.0220 | 1.5201 | 64.9 |
| 5 | −0.0846 | | | |

Appendix 1B
(Prior Art)
Richter Topogon

Focal Length: EFL = 1.0000
Aperture ratio: 1:6.3
Back Focal Length: BFL = .7860
Field Angle: 2 × 50°

| Surface No. | Radius | Distance to Next Surface | Refractive Index | Abbe Number |
|---|---|---|---|---|
| 1 | 0.1707 | | | |
| | | 0.0674 | 1.6229 | 60.1 |
| 2 | 0.2511 | | | |
| | | 0.0003 | | |
| 3 | 0.1380 | | | |
| | | 0.0076 | 1.7231 | 29.3 |
| 4 | 0.1115 | | | |
| | | 0.0985 | | |
| 5 | Aperture stop | | | |
| | | 0.0985 | | |
| 6 | −0.1115 | | | |
| | | 0.0076 | 1.7231 | 29.3 |
| 7 | −0.1380 | | | |
| | | 0.0003 | | |
| 8 | −0.2511 | | | |
| | | 0.0674 | 1.6229 | 60.1 |
| 9 | −0.1707 | | | |

Appendix 1C
(Prior Art)
Nikon Retrofocus (35 mm)

Focal Length: EFL = 1.0000
Aperture ratio: 1:2.8
Back Focal Length: BFL = 1.0844
Field Angle: 2 × 31°

| Surface No. | Radius | Distance to Next Surface | Refractive Index | Abbe Number |
|---|---|---|---|---|
| 1 | 1.5546 | | | |
| | | 0.0700 | 1.5203 | 58.7 |
| 2 | 0.4066 | | | |
| | | 0.3966 | | |
| 3 | 0.6884 | | | |
| | | 0.3717 | 1.7162 | 53.6 |
| 4 | −1.1160 | | | |
| | | 0.0619 | | |
| 5 | Aperture stop | | | |
| | | 0.1100 | | |
| 6 | −0.4995 | | | |
| | | 0.0360 | 1.7231 | 29.3 |
| 7 | 1.3178 | | | |
| | | 0.0360 | | |
| 8 | −1.3877 | | | |
| | | 0.0700 | 1.7468 | 47.9 |
| 9 | −0.4716 | | | |
| | | 0.0030 | | |
| 10 | 3.2470 | | | |
| | | 0.0700 | 1.6229 | 60.1 |

-continued

Appendix 1C
(Prior Art)
Nikon Retrofocus (35 mm)

| | |
|---|---|
| 11 | −1.8467 |

Appendix 1D
(Prior Art)
Sonnar

Focal Length: EFL = 1.0000  
Aperture ratio: 1:1.9  
Back Focal Length: BFL = .5793  
Field Angle: 2 × 13°

| Surface No. | Radius | Distance to Next Surface | Refractive Index | Abbe Number |
|---|---|---|---|---|
| 1 | 1.8792 | | | |
| | | 0.1000 | 1.5187 | 64.0 |
| 2 | −1.8792 | | | |
| | | 0.0050 | | |
| 3 | 0.4240 | | | |
| | | 0.2719 | 1.6152 | 58.4 |
| 4 | 0.7659 | | | |
| | | 0.0400 | | |
| 5 | −1.3207 | | | |
| | | 0.0300 | 1.7231 | 29.3 |
| 6 | 0.3253 | | | |
| | | 0.0600 | | |
| 7 | Aperture stop | | | |
| | | 0.1098 | | |
| 8 | 1.0864 | | | |
| | | 0.1100 | 1.6940 | 54.5 |
| 9 | −0.5267 | | | |

Appendix 1E
(Prior Art)
Zeiss Double Gauss (50 mm)

Focal Length: EFL = 1.0000  
Aperture ratio: 1:1.4  
Back Focal Length: BFL = .7098  
Field Angle: 2 × 23½°

| Surface No. | Radius | Distance to Next Surface | Refractive Index | Abbe Number |
|---|---|---|---|---|
| 1 | 0.8890 | | | |
| | | 0.1018 | 1.7206 | 47.7 |
| 2 | 5.7732 | | | |
| | | 0.0012 | | |
| 3 | 0.4361 | | | |
| | | 0.0971 | 1.7927 | 47.2 |
| 4 | 0.6812 | | | |
| | | 0.0318 | | |
| 5 | 0.9417 | | | |
| | | 0.0237 | 1.6942 | 31.0 |
| 6 | 0.3065 | | | |
| | | 0.1400 | | |
| 7 | Aperture stop | | | |
| | | 0.1455 | | |
| 8 | −0.3464 | | | |
| | | 0.0230 | 1.7343 | 28.5 |
| 9 | 7.4804 | | | |
| | | 0.1030 | 1.7923 | 47.2 |
| 10 | −0.6071 | | | |
| | | 0.0057 | | |
| 11 | −1.7485 | | | |
| | | 0.0877 | 1.7923 | 47.2 |
| 12 | −0.5650 | | | |
| | | 0.0026 | | |
| 13 | 3.2936 | | | |
| | | 0.0567 | 1.7479 | 44.5 |
| 14 | −2.6223 | | | |

Appendix 1F
(Prior Art)
Pentac

Focal Length: EFL = 1.0000  
Aperture ratio: 1:5.6  
Back Focal Length: BFL = .8594  
Field Angle: 2 × 15°

| Surface No. | Radius | Distance to Next Surface | Refractive Index | Abbe Number |
|---|---|---|---|---|
| 1 | 0.3726 | | | |
| | | 0.0423 | 1.6940 | 54.5 |
| 2 | −0.5476 | | | |
| | | 0.0159 | 1.5848 | 40.6 |
| 3 | 1.2182 | | | |
| | | 0.0700 | | |
| 4 | Aperture stop | | | |
| | | 0.0155 | | |
| 5 | −0.4129 | | | |
| | | 0.0129 | 1.5510 | 45.5 |
| 6 | 0.3471 | | | |
| | | 0.0704 | | |
| 7 | −15.4561 | | | |
| | | 0.0159 | 1.5848 | 40.6 |
| 8 | 0.3748 | | | |
| | | 0.0358 | 1.6940 | 54.5 |
| 9 | −0.3983 | | | |

Appendix 2

| Radius | Thickness | Medium | Refractive Index | Abbe Number |
|---|---|---|---|---|
| $d_a = 0.3$ | | | | |
| | $t_{ab} = .001$ | air | | |
| $r_b$ = flat base curve, aspheric | | | | |
| | $t_{bc} = .001$ | co-polymer | $n_{bc} = 1.567$ | $v_{bc} = 33.5$ |
| $r_c = .2710$ | | | | |
| | $t_{cd} = 1.996$ | Schott LaSFN3 | $n_{cd} = 1.8127$ | $v_{cd} = 40.5$ |
| $r_d = -.2710$ | | | | |
| | $t_{de} = .001$ | co-polymer | $n_{de} = 1.567$ | $v_{de} = 33.5$ |
| $r_e$ = flat base curve, aspheric | | | | |
| | $t_{ef} = .001$ | air | | |
| $d_f = 0.3$ | | | | |

$AD_b = -2.04$ e-8  $AE_b = -1.55$ e-11  $AF_b = -1.59$ e-14  
$AG_b = -3.03$ e-17  
$AD_e = 2.04$ e-8  $AE_e = 1.55$ e-11  $AF_e = 1.59$ e-14  
$AG_e = 3.03$ e-17

Appendix 3

| Radius | Thickness | Medium | Refractive Index | Abbe Number |
|---|---|---|---|---|
| $d_a = 0.3$ | | | | |
| | $t_{ab} = .01$ | air | | |
| $r_b = -3.0000$ | | | | |
| | $t_{bc} = .200$ | Schott LaF21 | $n_{bc} = 1.7923$ | $v_{bc} = 47.4$ |
| $r_c = -.4000$ | | | | |
| | $t_{cd} = .020$ | Co-polymer | $n_{cd} = 1.567$ | $v_{cd} = 33.5$ |
| $r_d = -1.9957$, aspheric | | | | |
| | $t_{de} = 1.54$ | air | | |
| $r_e = -1.9957$, aspheric | | | | |
| | $t_{ef} = .020$ | co-polymer | $n_{ef} = 1.567$ | $v_{ef} = 33.5$ |
| $r_f = .4000$ | | | | |
| | $t_{fg} = .200$ | Schott LaF21 | $n_{fg} = 1.7923$ | $v_{fg} = 47.4$ |
| $r_g = 3.0000$ | | | | |
| | $t_{gh} = .01$ | air | | |
| $d_h = 0.3$ | | | | |

$AD_d = 9.37$ e-9  $AE_d = 2.91$ e-12  $AF_d = 1.69$ e-15  
$AG_d = 1.32$ e-16  
$AD_e = -9.37$ e-9  $AE_e = -2.91$ e-12  $AF_e = -1.69$ e-15

-continued

Appendix 3

| Radius | Thickness | Medium | Refractive Index | Abbe Number |
|---|---|---|---|---|
| $AG_c = -1.32$ e-16 | | | | |

Appendix 4

| Radius | Thickness | Medium | Refractive Index | Abbe Number |
|---|---|---|---|---|
| $d_a = 0.3$ | | | | |
| | $t_{ab} = .150$ | Schott LaSF5 | $n_{ab} = 1.8858$ | $v_{ab} = 40.8$ |
| $r_b = -.3777$ | | | | |
| | $t_{bc} = .02$ | co-polymer | $n_{bc} = 1.567$ | $v_{bc} = 33.5$ |
| $r_c = 2.0000$, aspheric | | | | |
| | $t_{cd} = 1.66$ | air | | |
| $r_d = -2.0000$, aspheric | | | | |
| | $t_{de} = .02$ | co-polymer | $n_{de} = 1.567$ | $v_{de} = 33.5$ |
| $r_e = .3777$ | | | | |
| | $t_{ef} = .150$ | Schott LaSF5 | $n_{ef} = 1.8858$ | $v_{ef} = 40.8$ |
| $d_f = 0.3$ | | | | |
| $AD_c = 1.97$ e-8 $AE_c = 1.26$ e-11 $AF_c = 1.14$ e-14 | | | | |
| $AG_c = 1.68$ e-17 | | | | |
| $AD_d = -1.97$ e-8 $AE_d = -1.26$ e-11 $AF_d = -1.14$ e-14 | | | | |
| $AG_d = -1.68$ e-17 | | | | |

Appendix 5

| Radius | Thickness | Medium | Refractive Index | Abbe Number |
|---|---|---|---|---|
| $d_a = 0.3$ | | | | |
| | $t_{ab} = 0$ | air | | |
| $r_b = 1.2000$ | | | | |
| | $t_{bc} = .120$ | Schott LaSF5 | $n_{bc} = 1.8858$ | $v_{bc} = 40.8$ |
| $r_c = -.4366$ | | | | |
| | $t_{cd} = .020$ | Co-polymer | $n_{cd} = 1.5670$ | $v_{cd} = 33.5$ |
| $r_d = 1.0000$ | | | | |
| | $t_{de} = .010$ | air | | |
| $r_e =$ flat | | | | |
| | $t_{ef} = 1.700$ | Schott SF6 | $n_{ef} = 1.8126$ | $v_{ef} = 25.2$ |
| $r_f =$ flat | | | | |
| | $t_{fg} = .010$ | air | | |
| $r_g = -1.0000$ | | | | |
| | $t_{gh} = .020$ | co-polymer | $n_{gh} = 1.5670$ | $v_{gh} = 33.5$ |
| $r_h = .4366$ | | | | |
| | $t_{hi} = .120$ | Schott LaSF5 | $n_{hi} = 1.8858$ | $v_{hi} = 40.8$ |
| $r_i = -1.2000$ | | | | |
| | $t_{ij} = 0$ | air | | |
| $d_j = 0.3$ | | | | |
| tl,1 $AD_d = 2.35$ e-8 $AE_d = 1.88$ e-11 | | | | |
| $AF_d = 1.93$ e-14 | | | | |
| $AG_d = 3.69$ e-17 | | | | |
| $AD_g = -2.35$ e-8 $AE_g = -1.88$ e-11 | | | | |
| $AF_g = -1.93$ e-14 | | | | |
| $AG_g = -3.69$ e-17 | | | | |

Appendix 6A

Focal length: EFL = 1.000
Aperture ratio: 1:16
Back focal length: BFL = 0.8658
Field angle: 2 × 50°

| Radius | Thickness | Medium | Refractive Index | Abbe Number |
|---|---|---|---|---|
| $r_a = 0.9888$ | | | | |
| | $t_{ab} = 0.0100$ | Schott LLF1 | $n_{ab} = 1.5510$ | $v_{ab} = 45.5$ |
| $r_b = 0.1507$ | | | | |
| | $t_{bc} = 0.0500$ | Schott LaF21 | $n_{bc} = 1.7923$ | $v_{bc} = 47.4$ |
| $r_c = 0.4586$ | | | | |
| | $t_{cd} = 0.0848$ | air | | |
| $d_d =$ aperture stop diameter = 0.056 | | | | |
| | $t_{de} = 0.0789$ | air | | |
| $r_e = -0.5200$ | | | | |
| | $t_{ef} = 0.0500$ | Schott LaF21 | $n_{ef} = 1.7923$ | $v_{ef} = 47.4$ |
| $r_f = -0.1524$ | | | | |
| | $t_{fg} = 0.0100$ | Schott LLF1 | $n_{fg} = 1.5510$ | $v_{fg} = 45.5$ |
| $r_g = -1.2519$ | | | | |

Appendix 6B

Focal length: EFL = 1.000
Aperture ratio: 1:16
Back focal length: BFL = 0.8302
Field angle: 2 × 50°

| Radius | Thickness | Medium | Refractive Index | Abbe Number |
|---|---|---|---|---|
| $r_a = 0.8394$ | | | | |
| | $t_{ab} = 0.0100$ | Co-polymer | $n_{ab} = 1.5510$ | $v_{ab} = 33.5$ |
| $r_b = 0.1863$ | | | | |
| | $t_{bc} = 0.0500$ | Schott LaSF5 | $n_{bc} = 1.8858$ | $v_{bc} = 40.8$ |
| $r_c = 0.4565$ | | | | |
| | $t_{cd} = 0.1123$ | air | | |
| $d_d =$ aperture stop diameter = 0.054 | | | | |
| | $t_{de} = 0.1121$ | air | | |
| $r_e = -0.4420$ | | | | |
| | $t_{ef} = 0.0500$ | Schott LaSF5 | $n_{ef} = 1.8858$ | $v_{ef} = 40.8$ |
| $r_f = -0.1926$ | | | | |
| | $t_{fg} = 0.0100$ | Co-polymer | $n_{fg} = 1.567$ | $v_{fg} = 33.5$ |
| $r_g = -0.7080$ | | | | |

I claim:

1. A lens assembly for incorporation into an optical transfer system wherein four such assemblies define an optical transfer module for transferring an image between successive image planes, comprising:
a positive element constructed of a first material having a relatively high index of refraction; and
a negative element cemented to said positive element and being constructed of a second material having a relatively low index of refraction;
said positive and negative elements being characterized by surface radii and refractive indices chosen to define at least one curved interface and a significant index difference across said interface;
the assembly being configured so that when four such assemblies are aligned to define the transfer module, two of the assemblies have their respective curved interfaces proximate respective ones of the successive image planes while the remaining two have their respective curved interfaces proximate an intermediate plane halfway between the image planes;

the surface radii and refractive indices of said positive and negative elements being chosen so that the normalized Petzval sum of the transfer module is significantly less than the inverse of the refractive index of said first material, with the difference between said inverse and the Petzval sum being equal to the sum of bonding, spacing, and index difference contributions;

the index difference contribution to the Petzval sum correction being at least two-thirds the sum of the bending, spacing, and index difference contributions;

the dispersion of said first and second materials being chosen to substantially correct chromatic aberration;

at least one of said elements including portions defining an outer aspheric surface to correct spherical aberration.

2. A wide angle objective comprising:

a first negative element;

a first positive element cemented to said first negative element to define a first cemented pair with a first curved interface;

a second positive element;

a second negative element cemented to said second positive element to define a second cemented pair spaced apart from said first cemented pair and having a second curved interface; and an aperture stop located between said first and second cemented pairs to reduce spherical aberration;

said positive elements and said negative elements being characterized by surface radii and refractive indices chosen to define a significant index difference across each of said interfaces such that the normalized Petzval sum of the objective is significantly less than the inverse of the refractive index of said first positive element with the difference between said inverse and the Petzval sum being equal to the sum of bending, spacing, and index difference contributions;

the index difference contribution to the Petzval sum correction being at least two-thirds the sum of the bending, spacing, and index difference contributions.

3. The invention of claim 2 wherein said first and second positive elements and said first and second negative elements are formed of materials having their dispersions chosen to substantially correct chromatic aberration.

4. The invention of claim 2 wherein said first and second positive elements and said first and second negative elements are similarly configured, and said aperture stop is generally symmetrically located.

5. An optical transfer module for transferring an image between successive image planes, comprising:

first and second symmetrically disposed, axially aligned composite assemblies, each assembly including a central positive element constructed of a first material having a relatively high index of refraction, and first and second negative elements axially spaced apart from each other by said positive element and cemented thereto, said negative elements being constructed of a second material having a relatively low index of refraction, the dispersions of said first and second materials being such that the chromatic aberration of said transfer module assumes a desired low value, each of said first and second negative elements having portions defining an outer aspheric surface to correct spherical aberration, said first and second negative elements and said central positive element being configured to define respective first and second curved interfaces and a significant index difference across each of said interfaces;

said composite assemblies being disposed at relative axial locations between the image planes such that the transfer module is symmetric about an intermediate plane halfway between the image planes, with the first curved interface of said first composite assembly located proximate one of the image planes, the second curved interface of said first and second composite assemblies located proximate the intermediate plane, and the first curved interface of said second composite assembly located proximate the other of the image planes;

the index difference contribution to the Petzval sum correction dominating the bending and spacing contributions.

6. The lens of claim 5 wherein said first and second negative elements are substantially identical and are disposed symmetrically with respect to one another.

7. A lens assembly for incorporation into an optical transfer system wherein two such assemblies define an optical transfer module for transferring an image between successive image planes, comprising:

a central positive element constructed of a first material having a relatively high index of refraction; and first and second negative elements axially spaced apart from each other by said positive element and cemented thereto, said negative elements being constructed of a second material having a relatively low index of refraction;

the dispersions of said first and second materials being such that the chromatic aberration of said lens assembly assumes a desired low value;

each of said first and second negative elements having portions defining an outer aspheric surface to correct spherical aberration;

said first and second negative elements and said central positive element being configured to define respective first and second curved interfaces and a significant index difference across each of said interfaces;

the assembly being configured so that when two such assemblies are aligned to define the transfer module, the assemblies have their respective first curved interfaces proximate respective ones of the successive image planes and their respective second curved interfaces proximate an intermediate plane halfway between the image planes;

the surface radii and refractive indices of said positive and negative elements being chosen so that the normalized Petzval sum of the transfer module is significantly less than the inverse of the refractive index of said first material, with the difference between said inverse and the Petzval sum being equal to the sum of bending, spacing, and index difference contributions;

the index difference contribution to the Petzval sum correction dominating the bending and spacing contributions.

8. A lens assembly for incorporation into an optical transfer system wherein four such assemblies define an optical transfer module for transferring an image between successive image planes, comprising:

a positive element constructed of a first material having a relatively high index of refraction; and a negative element cemented to said positive element, being constructed of a second material having a relatively low index of refraction;

the dispersions of said first and second materials being such that the chromatic aberration of said lens assembly assumes a desired low value;

at least one of said positive and negative elements having portions defining an outer aspheric surface to correct spherical aberration;

said positive and negative elements being configured to define a curved interface therebetween and a significant index difference across said interface;

the assembly being configured so that when four such assemblies are aligned to define the transfer module, two of the assemblies have their respective curved interfaces proximate respective ones of the successive image planes while the remaining two have their respective curved interfaces proximate an intermediate plane halfway between the image planes;

the surface radii and refractive indices of said positive and negative elements being chosen so that the normalized Petzval sum of the transfer module is significantly less than the inverse of the refractive index of said first material, with the difference between said inverse and the Petzval sum being equal to the sum of bending, spacing, and index difference contributions;

the index difference contribution to the Petzval sum correction dominating the bending and spacing contributions.

9. The invention of claim 8 wherein said outer aspheric surface is on said negative element.

10. A lens assembly for incorporation into an optical transfer system wherein two such assemblies define an optical transfer module for transferring an image between successive image planes, comprising:

a central element having a power of a first sense, being constructed of a first material hving a first index of refraction; and first and second end elements each having a power of a second sense opposite to said first sense, being axially spaced apart from each other by said central element and cemented thereto, said end elements being constructed of a second material having a second index of refraction;

said first and second indices of refraction differing from one another, the result of subtracting said second index of refraction from said first index of refraction having said first sense;

said central element and said first and second end elements being characterized by surface radii and refractive indices chosen to define respective first and second curved interfaces and a significant index difference across each of said interfaces;

the assembly being configured so that when two such assemblies are aligned to define the transfer module, the assemblies have their respective first curved interfaces proximate respective ones of the successive image planes and their respective second curved interfaces proximate an intermediate plane halfway between the image planes;

the surface radii and refractive indices of said central and end elements being chosen so that the normalized Petzval sum of the transfer module is significantly less than the inverse of the larger of said first and second refractive indices with the difference between said inverse and the Petzval sum being equal to the sum of bending, spacing, and index difference contributions;

the index difference contribution to the Petzval sum correction being at least two-thirds the sum of the bending, spacing, and index difference contributions;

the dispersions of said first and second materials being chosen to substantially correct chromatic aberration;

each of said first and second end elements including portions defining an outer aspheric surface to correct spherical aberration.

11. The invention of claim 10 wherein said first sense is positive whereupon said central element has positive power and said first material has a relatively high index of refraction, and said end elements have negative power and said second material has a relatively low index of refraction.

12. The invention of claim 11 wherein said central element is made of glass and said end elements are made of plastic.

13. The invention of claim 10 wherein said end elements are substantially identical and disposed symmetrically with respect to one another.

14. An optical transfer module for transferring an image between successive image planes, comprising:

first, second, third, and fourth axially aligned composite assemblies, each assembly including a positive element constructed of a first material having a relatively high index of refraction $n_{pos}$, and a negative element cemented to said positive element and being constructed of a second material having a relatively low index of refraction;

said positive and negative elements being characterized by surface radii and refractive indices chosen to define respective first, second, third, and fourth curved interfaces and a significant index difference across each of said interfaces;

said composite assemblies being disposed at relative axial locations between the image planes such that the transfer module is symmetric about an intermediate plane halfway between the image planes, with said first curved interface located proximate one of the image planes, said second and third curved interfaces located proximate the intermediate plane, and said fourth curved interface located proximate the other of the image planes;

said surface radii and refractive indices being chosen so that the normalized Petzval sum of the transfer module is significantly less than $1/n_{pos}$ with the difference between $1/n_{pos}$ and the Petzval sum being equal to the sum of bending, spacing, and index difference contributions;

the index difference contribution to the Petzval sum correction being at least two-thirds the sum of the bending, spacing, and index difference contributions;

the dispersions of said first and second materials being chosen to substantially correct chromatic aberration;

at least one of said positive and negative elements including portions defining an aspheric surface to correct spherical aberration.

15. The invention of claim 14 wherein all four assemblies are substantially identical.

16. The invention of claim 14 wherein said aspheric surface is an outer surface of said assembly.

17. The invention of claim 14 wherein said negative element is formed with said aspheric surface.

18. The invention of claim 14, and further comprising:
a first cylinder located between said first and second assemblies; and
a second cylinder located between said third and fourth assemblies;
said cylinders being formed of transparent optical material having flat end faces.

19. An optical transfer module for transferring an image between successive image planes, comprising:
first, second, third, and fourth axially aligned, substantially identical composite assemblies, each assembly including
a positive element constructed of a first material having a relatively high index of refraction $n_{pos}$, and
a negative element cemented to said positive element and being constructed of a second material having a relatively low index of refraction,
at least one of said positive and negative elements including portions defining an aspheric surface to correct spherical aberration;
a first cylinder located between said first and second assemblies; and
a second cylinder located between said third and fourth assemblies;
said cylinders being formed of a third material and having flat end faces;
said positive elements and said negative elements being characterized by surface radii and refractive indices chosen to define respective first, second, third, and fourth curved interfaces and a significant index difference across each of said interfaces;
said composite assemblies being disposed at relative axial locations between the image planes such that the transfer module is symmetric about an intermediate plane halfway between the image planes, with said first curved interface located proximate one of the image planes, said second and third curved interfaces located proximate the intermediate plane, and said fourth curved interface location proximate the other of the image planes;
said surface radii and refractive indices being chosen so that the normalized Petzval sum of the transfer module is significantly less than $1/n_{pos}$ with the difference between $1/n_{pos}$ and the Petzval sum being equal to the sum of bending, spacing, and index difference contributions;
the index difference contribution to the Petzval sum correction being at least two-thirds the sum of the bending, spacing, and index difference contributions;
the dispersions of said first, second, and third materials being chosen to substantially correct chromatic aberration.

20. A lens assembly for incorporation into an optical transfer system wherein two such assemblies define an optical transfer module for transferring an image between successive image planes, comprising:
a symmetrical central element constructed of a first material having a first index of refraction; and
first and second substantially identical end elements axially spaced apart from each other by said central element and cemented thereto, said end elements being constructed of a second material having a second index of refraction;
the dispersions of said first and second materials being such that the chromatic aberration of said lens assembly assumes a desired low value;
said first and second end elements and said central element being configured to define respective first and second curved interfaces and a significant index difference across each of said interfaces;
the assembly being configured so that when two such assemblies are aligned to define the transfer module, the assemblies have their respective first curved interfaces proximate respective ones of the successive image planes and their respective second curved interfaces proximate an intermediate plane halfway between the image planes;
the surface radii and refractive indices of said central and end elements being chosen so that the normalized Petzval sum of the transfer module is significantly less than the inverse of the larger of said first and second refractive indices with the difference between said inverse and the Petzval sum being equal to the sum of bending, spacing, and index difference contributions;
the index difference contribution to the Petzval sum correction dominates the bending and spacing contributions.

21. The invention of claim 20 wherein each of said first and second end elements has portions defining an outer aspheric surface to correct spherical aberration.

22. The invention of claim 20 wherein:
said first index of refraction exceeds said second index of refraction;
said central element has positive power; and
said end elements have negative power.

23. A wide angle objective comprising:
a first subassembly including at least a first negative element and a first positive element cemented thereto;
a second subassembly including a second positive element and a second negative element cemented thereto, said second subassembly being spaced apart from said first subassembly;
an aperture stop located between said first and second subassembly to reduce spherical aberration;
said first and second positive elements and said first and second negative elements being configured to define respective first and second curved interfaces and a significant index difference across each of said interfaces such that the normalized Petzval sum of the objective is significantly less than the inverse of the refractive index of said first positive element with the difference between said inverse and the Petzval sum being equal to the sum of bending, spacing, and index difference contributions;
the index difference contribution to the Petzval sum correction dominating the bending and spacing contributions.

24. The invention of claim 23 wherein said objective is of generally symmetric configuration.

25. The invention of claim 24 wherein said subassemblies are cemented pairs.

26. The invention of claim 1 or 2 or 3 or 4 or 5 or 6 or 7 or 8 or 9 or 10 or 11 or 12 or 13 or 14 or 15 or 16 or 17 or 18 or 19 or 20 or 21 or 22 or 23 or 24 or 25 wherein said significant index difference is an index difference of at least about 0.225.

27. The invention of claim 1 or 8 or 9 or 14 or 15 or 16 or 17 or 18 or 19 or 20 or 21 or 22 or 23 or 24 or 25 wherein said curved interface has a curvature at least comparable to the curvature of any external surfaces of said positive and negative elements.

28. The invention of claim 2 or 3 or 4 or 5 or 6 or 7 or 10 or 11 or 12 or 13 wherein said curved interfaces have respective curvatures at least comparable to the curvatures of any external surfaces of said positive and negative elements.

29. A triplet assembly defining half a transfer module for an endoscope relay system comprising elements made of optical materials and having normalized geometrical parameters as follows:

| Radius | Thickness | Medium | Refractive Index | Abbe Number |
|---|---|---|---|---|
| $d_a$ = stop diameter = 0.3 | | | | |
| | $t_{ab}$ = 0.001 | air | | |
| $r_b$ = flat base curve, aspheric | | | | |
| | | co-polymer | $n_{bc}$ = 1.567 | $v_{bc}$ = 33.5 |
| $r_c$ = 0.2710 | | | | |
| | $t_{cd}$ = 1.996 | Schott LaSFN3 | $n_{cd}$ = 1.8127 | $v_{cd}$ = 40.5 |
| $r_d$ = −0.2710 | | | | |
| | $t_{de}$ = 0.001 | co-polymer | $n_{de}$ = 1.567 | $v_{de}$ = 33.5 |
| $r_e$ = flat base curve, aspheric | | | | |
| | $t_{ef}$ = 0.001 | air | | |
| $d_f$ = stop diameter = 0.3 | | | | |

Aspheric Coefficients
$AD_b = -2.04$ e-8 $AE_b = -1.55$ e-11 $AF_b = -1.59$ e-14
$AG_b = -3.03$ e-17
$AD_e = 2.04$ e-8 $AE_e = 1.55$ e-11 $AF_e = 1.59$ e-14
$AG_e = 3.03$ e-17 where the single subscripts denote the characteristic surfaces of the elements and the double subscripts denote the regions between corresponding surfaces.

30. A pair of doublet assemblies defining half a transfer module for an endoscope relay system comprising elements made of optical materials and having normalized geometrical parameters as follows:

| Radius | Thickness | Medium | Refractive Index | Abbe Number |
|---|---|---|---|---|
| $d_a$ = stop diameter = 0.3 | | | | |
| | $t_{ab}$ = 0.010 | air | | |
| $r_b$ = −3.0000 | | | | |
| | $t_{bc}$ = 0.200 | Schott LaF21 | $n_{bc}$ = 1.7923 | $v_{bc}$ = 47.4 |
| $r_c$ = −0.4000 | | | | |
| | $t_{cd}$ = 0.020 | co-polymer | $n_{cd}$ = 1.567 | $v_{cd}$ = 33.5 |
| $r_d$ = −1.9957, aspheric | | | | |
| | $t_{de}$ = 1.540 | air | | |
| $r_e$ = −1.9957, aspheric | | | | |
| | $t_{ef}$ = 0.200 | co-polymer | $n_{ef}$ = 1.567 | $v_{ef}$ = 33.5 |
| $r_f$ = 0.4000 | | | | |
| | $t_{fg}$ = 0.200 | Schott LaF21 | $n_{fg}$ = 1.7923 | $v_{fg}$ = 47.4 |
| $r_g$ = 3.0000 | | | | |
| | $t_{gh}$ = 0.010 | air | | |
| $d_h$ = stop diameter = 0.3 | | | | |

Aspheric Coefficients
$AD_d = 9.37$ e-9 $AE_d = 2.91$ e-12 $AF_d = 1.69$ e-15
$AG_d = 1.32$ e-16
$AD_e = -9.37$ e-9 $AE_e = -2.91$ e-12 $AF_e = -1.69$ e-15
$AG_e = -1.32$ e-16 where the single subscripts denote the characteristic surfaces of the elements and the double subscripts denote the regions between corresponding surfaces.

31. A pair of doublet or half triplet assemblies defining half a transfer module for an endoscope relay system comprising elements made of optical materials and having normalized geometrical parameters as follows:

| Radius | Thickness | Medium | Refractive Index | Abbe Number |
|---|---|---|---|---|
| $d_a$ = stop diameter = 0.3 | | | | |
| | $t_{ab}$ = 0.150 | Schott LaSF5 | $n_{ab}$ = 1.8858 | $v_{ab}$ = 40.8 |
| $r_b$ = −0.3777 | | | | |
| | $t_{bc}$ = 0.020 | co-polymer | $n_{bc}$ = 1.567 | $v_{bc}$ = 33.5 |
| $r_c$ = 2.0000, aspheric | | | | |
| | $t_{cd}$ = 1.660 | air | | |
| $r_d$ = −2.0000, aspheric | | | | |
| | $t_{de}$ = 0.020 | co-polymer | $n_{de}$ = 1.567 | $v_{de}$ = 33.5 |
| $r_e$ = 0.3777 | | | | |
| | $t_{ef}$ = 0.150 | Schott LaSF5 | $n_{ef}$ = 1.8858 | $v_{ef}$ = 40.8 |
| $d_f$ = stop diameter = 0.3 | | | | |

Aspheric Coefficients
$AD_c = 1.97$ e-8 $AE_c = 1.26$ e-11 $AF_c = 1.14$ e-14
$AG_c = 1.68$ e-17
$AD_d = -1.97$ e-8 $AE_d = -1.26$ e-11 $AF_d = -1.14$ e-14
$AG_d = -1.68$ e-17 where the single subscripts denote the characteristic surfaces of the elements and the double subscripts denote the regions between corresponding surfaces.

32. A paired doublet and cylinder assembly defining half a transfer module for an endoscope relay system comprising elements made of optical materials and having normalized geometrical parameters as follows:

| Radius | Thickness | Medium | Refractive Index | Abbe Number |
|---|---|---|---|---|
| $d_a$ = stop diameter = 0.3 | | | | |
| | $t_{ab}$ = 0 | air | | |
| $r_b$ = 1.2000 | | | | |
| | $t_{bc}$ = 0.120 | Schott LaSF5 | $n_{bc}$ = 1.8858 | $v_{bc}$ = 40.8 |
| $r_c$ = −0.4366 | | | | |
| | $t_{cd}$ = 0.020 | co-polymer | $n_{cd}$ = 1.5670 | $v_{cd}$ = 33.5 |
| $r_d$ = 1.0000, aspheric | | | | |
| | $t_{de}$ = 0.010 | air | | |
| $r_e$ = flat | | | | |
| | $t_{ef}$ = 1.700 | Schott SF6 | $n_{ef}$ = 1.8126 | $v_{ef}$ = 25.1 |
| $r_f$ = flat | | | | |
| | $t_{fg}$ = 0.020 | air | | |
| $r_g$ = −1.0000, aspheric | | | | |
| | $t_{gh}$ = 0.020 | co-polymer | $n_{gh}$ = 1.5670 | $v_{gh}$ = 33.5 |
| $r_h$ = 0.4366 | | | | |
| | $t_{hi}$ = 0.120 | Schott LaSF5 | $n_{hi}$ = 1.8858 | $v_{hi}$ = 40.8 |
| $r_i$ = −1.2000 | | | | |
| | $t_{ij}$ = 0 | air | | |
| $d_j$ = stop diameter = 0.3 | | | | |

Aspheric Coefficients
$AD_d = 2.35$ e-8 $AE_d = 1.88$ e-11 $AF_d = 1.93$ e-14

-continued

| Radius | Thickness | Medium | Refractive Index | Abbe Number |
|---|---|---|---|---|

$AG_d = 3.69$ e-17
$AD_g = -2.35$ e-8  $AE_g = -1.88$ e-11  $AF_g = -1.93$ e-14
$AG_g = -3.69$ e-17 where the single subscripts denote the characteristic surfaces of the elements and the double subscripts denote the regions between corresponding surfaces.

33. A wide angle objective comprising elements having geometrical parameters normalized for unit power and optical parameters as follows:

Focal Length: EFL = 1.000
Aperture ratio: 1:16
Back focal length: BFL = 0.8658
Field angle: 2 × 50°

| Radius | Thickness | Medium | Refractive Index | Abbe Number |
|---|---|---|---|---|
| $r_a = 0.9888$ | | | | |
| | $t_{ab} = 0.0100$ | Schott LLF1 | $n_{ab} = 1.5510$ | $v_{ab} = 45.5$ |
| $r_b = 0.1507$ | | | | |
| | $t_{bc} = 0.0500$ | Schott LAF21 | $n_{bc} = 1.7923$ | $v_{bc} = 47.4$ |
| $r_c = 0.4586$ | | | | |
| | $t_{cd} = 0.0848$ | air | | |
| $d_d$ = aperture stop diameter = 0.056 | | | | |
| | $t_{de} = 0.0789$ | air | | |
| $r_e = -0.5200$ | | | | |
| | $t_{ef} = 0.0500$ | Schott LaF21 | $n_{ef} = 1.7923$ | $v_{ef} = 47.4$ |
| $r_f = -0.1524$ | | | | |
| | $t_{fg} = 0.0100$ | Schott LLF1 | $n_{fg} = 1.5510$ | $v_{fh} = 45.5$ |

$r_g = -1.2519$ where the single subscripts denote the characteristic surfaces of the elements and the double subscripts denote the regions between corresponding surfaces.

34. A wide angle objective comprising elements having geometrical parameters normalized for unit power and optical parameters as follows:

Focal Length: EFL =]1.000
Aperture ratio: 1:16
Back focal length: BFL = 0.8302
Field angle: 2 × 50°

| Radius | Thickness | Medium | Refractive Index | Abbe Number |
|---|---|---|---|---|
| $r_a = 0.8394$ | | | | |
| | $t_{ab} = 0.0100$ | Co-polymer | $n_{ab} = 1.5510$ | $v_{ab} = 33.5$ |
| $r_b = 0.1863$ | | | | |
| | $t_{bc} = 0.0500$ | Schott LaSF5 | $n_{bc} = 1.8858$ | $v_{bc} = 40.8$ |
| $r_c = 0.4565$ | | | | |
| | $t_{cd} = 0.1123$ | air | | |
| $d_d$ = aperture stop diameter = 0.054 | | | | |
| | $t_{de} = 0.1121$ | air | | |
| $r_e = -0.4420$ | | | | |
| | $t_{ef} = 0.0500$ | Schott LaSF5 | $n_{ef} = 1.8858$ | $v_{ef} = 40.8$ |
| $r_f = -0.1926$ | | | | |
| | $t_{fg} = 0.0100$ | Co-polymer | $n_{fg} = 1.567$ | $v_{fg} = 33.5$ |

$r_g = -0.7080$ where the single subscripts denote the characteristic surfaces of the elements and the double subscripts denote the regions between corresponding surfaces.

* * * * *